United States Patent Office 3,415,597
Patented Dec. 10, 1968

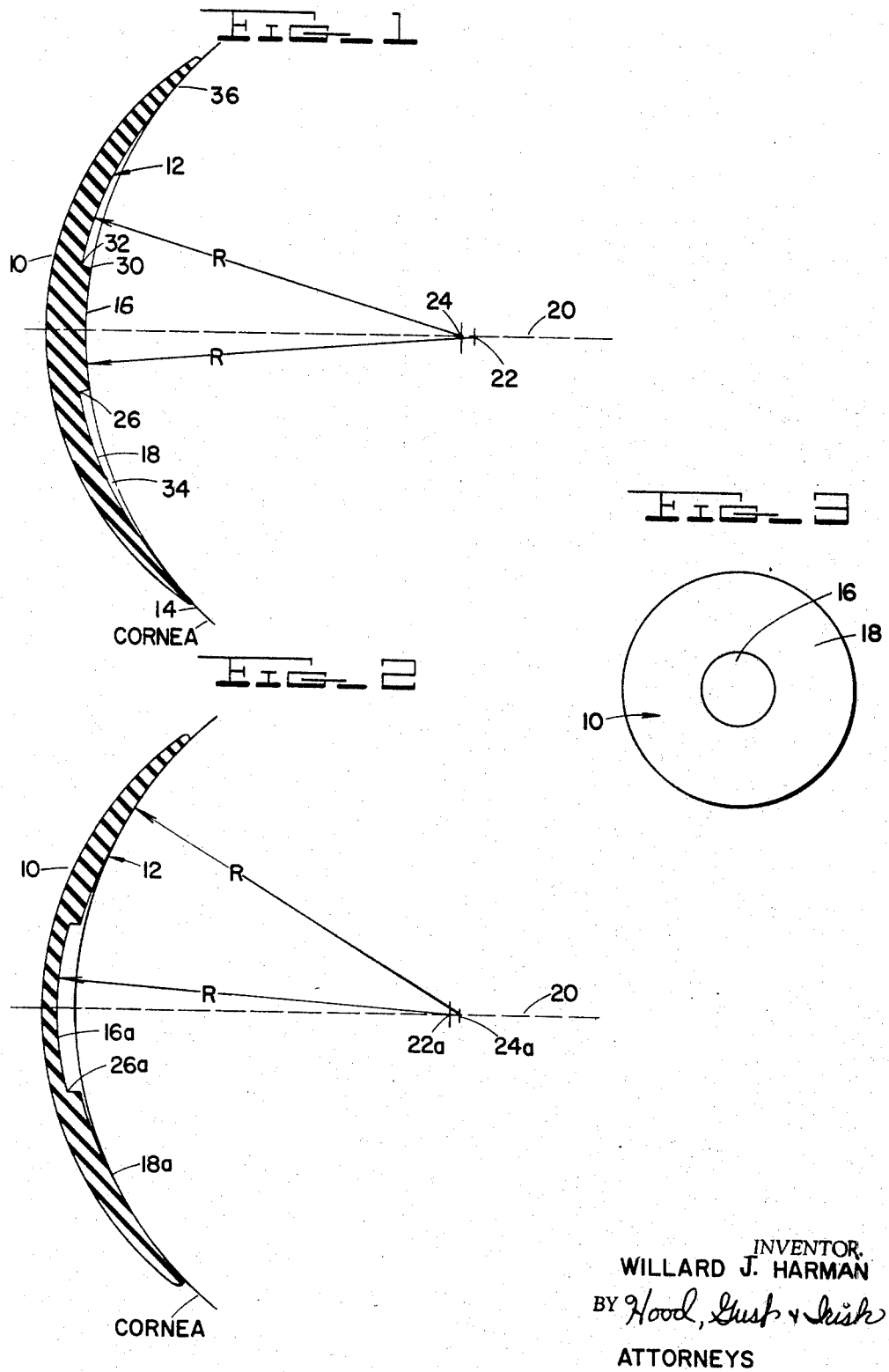

3,415,597
CORNEAL CONTACT LENS WITH OFFSET
CONCAVE SURFACE PORTIONS
Willard J. Harman, 410 N. Jefferson St.,
Huntington, Ind. 46750
Filed Nov. 20, 1962, Ser. No. 239,402
2 Claims. (Cl. 351—160)

The present invention relates to contact lenses and more particularly to corneal contact lenses uniquely constructed to provide near normal tear flow over the surface of the cornea and uniform optical power throughout the optic zone.

Generally speaking, there are two types of contact lenses, scleral and corneal. The present invention is concerned primarily with the lenses of the corneal type. As is well known, these may vary slightly in diameter, but the typical corneal lens has an outer diameter of approximately 9.5 millimeters.

Corneal surface tissue has its respiratory and metabolic requirements supplied in part by tears or lachrymal fluid which is swept over the surface of the eye by the blinking action of the eyelids.

Corneal contact lenses normally intimately fit on the cornea and are designed such that the central area of the lens (termed the optic zone, usually 7.5 millimeters to 8.0 millimeters diameter) has a uniform spherical or toroidal inner surface to provide uniform optical power over this area. The perimetral margin of the lens between the optic zone and the edge (termed the bevel) usually has a flatter curve or curves (longer radii of curvature than that of the optic zone.) The edge of the lens has a rounded polished shape so that the overall lens (usually 9.0 to 9.5 millimeters diameter) will achieve an optimum mechanical fit as well as permit tear flow beneath the lens and over the corneal surface covered by the lens. It has been found with the fitting of contact lenses that the cornea does not have a generally uniform spherical or toroidal surface over its major area. Only a small central area, termed the corneal cap, has this property. Beyond the corneal cap there are varying degrees of flattening of the corneal surface until its juncture with the sclera at the limbus. The corneal cap area is usually much smaller than the optic zone area of the typical corneal contact lens and is usually considered to be about 4.0 millimeters to 5.0 millimeters in diameter. Accurate measurements of the radius of curvature of the corneal cap can be made with an instrument called an ophthalmometer. If the corneal cap is spherical, its radius of curvature is determined or if toroidal a maximum and minimum radius can be determined. It is usually on the basis of these measurements that the inner radius of the optic zone of the lens is determined and it is usually the longest radius of the corneal cap area, or a slight variation from this.

Because of the flattening of the cornea beyond the corneal cap and because the optic zone of the lens must be larger than the corneal cap, it is difficult to get good alignment of the inner curves of the lens and the surface of the cornea. There is often a tendency for the lens to bear heavily at its peripheral contact with the cornea and to have a space between the central area of the cornea and the lens. This produces a restriction of tear flow between the lens and the covered area of the cornea. Several methods of reducing this objection are in use. The flattening peripheral curves (bevel) mentioned previously are for this purpose. In addition, some fitters recommend an inner radius of the optic zone of slightly greater length than the radius of the optic cap to achieve a better alignment. Others attempt to measure the degree of flattening of the cornea beyond the cap and thus to choose a radius of curvature that more closely approaches the total area covered by the optic zone. Others cut small channels on the inner surface extending from the periphery toward the center of the lens to permit better tear flow under the lens. These channels do not dare extend to any extent within the optic zone area for otherwise they interfere with vision by disturbing the uniform power needed in this area.

In view of the foregoing, it is therefore an object of this invention to provide a corneal contact lens constructed in such a manner that near normal tear flow to the corneal tissue is provided while the power of the lens is maintained uniform throughout the optic zone.

Another object of this invention is to provide a corneal lens which is more comfortable to wear by controlling the contact area of the lens on the cornea. A nearly exact alignment fit to the corneal cap can be made if desired. It can also be designed to control tear flow and tear reservoir depth under the optic zone area of the lens. The lens may be constructed so as to maintain substantially uniform power throughout the full optic zone area of the lens.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a cross-section of a lens embodying the present invention;

FIG. 2 is a similar cross-sectional illustration of another embodiment of this invention; and FIG. 3 is a front elevation of either of the lenses of FIGS. 1 and 2.

Referring to the drawings, the material and general construction of the contact lenses are generally conventional, the shapes being concavo-convex which produce the needed lens correction, and the material being glass or plastic. Preferably, plastic is used because of its chemical inertness, a suitable chemical being methyl methacrylate. The thickness dimensions of the lenses may also be conventional of, say, between 0.15 and 0.2 millimeter. The outside diameter of the lens is made slightly less than the outline of the corneal surface. The front or outer surface 10 of the lens may have any suitable curvature, depending upon the optical power desired, while the inner or rear surface, generally indicated by the reference numeral 12, is preferably given substantially the same curvature as the outer surface of the corneal cap 14.

The invention is primarily concerned with the configuration of the inner surface 12. This surface in the lens embodiments illustrated in FIGS. 1 and 2 is divided into two, stepped curvature portions which, in FIG. 1, are indicated by the numerals 16 and 18, respectively. The inner portion 16 is shown as being circular and located in the central portion of the lens, the other portion 18 being annular in shape and concentrically surrounding the portion 16. The cross-sectional curvatures of these two portions 16 and 18 have the same radius "R," the centers of curvature being located on the optical axis 20 of the lens but slightly spaced apart as indicated by the numerals 22 and 14, respectively. The curved portion 18, therefore, has its center at 24 while the center of the curved portion 16 is at 22.

The two curved portions 16 and 18 are joined by means of a circular shoulder or transversely extending surface 26. Desirably, this surface 26 extends in such a direction that little or no interference with viewing is presented inasmuch as this surface 26 is located well within, and in fact may be situated near the center of the optic zone. In one embodiment, this surface 26 extends in a direction which is perpendicular to the inner concave surface. The corners 30 and 32 of the surface 26 are preferably slightly rounded so as to guard against irritating the corneal tissue which is contacted by the lens. It is not necessary that the corner 32 be rounded since it never does come into contact with the tissue. In some designs, the sharper this corner 32, the better the result, inasmuch as less optical interference is presented by a sharp corner than by a rounded one.

In one practical embodiment of this invention, the spacing between the centers 22 and 24, hence the axial spacing between the surfaces 16 and 18, lies in the range of from .05 millimeter to .07 millimeter. Thus, the offsetting between the two surfaces 16 and 18 is extremely small, but is sufficiently large to provide an annular clearance or duct between the surface portion 18 and the corneal surface. The diameter of surface 16 is approximately 5.5 millimeters in diameter to match the corneal cap and has a radius approximating the radius found for the corneal cap. This clearance or duct is indicated in FIG. 1 by the numeral 34. In addition to serving as a duct, this space will be partially filled by the flattening area of the cornea which surrounds the corneal cap without lifting the central area of the lens away from the cap as occurs with conventional, single surface (within the optic zone) lenses now in use. At the outer perimetral surface portion 36 of the portion 18, the lens will gently contact the cornea where customary flatter peripheral curves or channels may be used as this will be outside the optic zone. This need not necessarily be the case, but it may be stated that the contact in this region of the numeral 36 should be such as to permit the flow of tears therebeneath.

In use, the lens of FIG. 1 is installed on the cornea in the conventional way. The portion 16 intimately contacts the central portion of the cornea while the outer portion 18 is spaced therefrom. The blinking action of the eyelids over the lens produces the usual flow of tears such that this flow can pass through the clearance or duct 34 and thereby come into contact with the centralmost regions of the corneal surface. In other words, irrigation of the corneal surface in the optic zone is assured.

Inasmuch as the radii "R" of the portions 16 and 18 are equal, the power of the lens throughout the optical zone is uniform. In other words, there is substantially no difference in the power of the lens in the regions of the portions 16 and 18. Inasmuch as the surface 26 is quite small and furthermore extends in the direction of the thickness of the lens, it is practically imperceptible and does not interfere with viewing. Thus, the lens has uniform optical power over the entire optical zone and at the same time provides for optimum irrigation of the corneal surface.

FIG. 2 illustrates a slightly different embodiment of this invention wherein the portions of FIG. 1 indicated by the numerals 16 and 18 are reversed. In other words, referring to FIG. 2, the inner portion 16a is offset forwardly from the outer portion 18a. The curvatures of these two portions 16a and 18a have the same radius "R," the center for the portion 16a being located on the official axis 20 at 22a and the center for the portion 18a at 24a. The portion 18a is initially formed to substantially the same curvature as that of the corneal surface to be contacted. Thus, the portion 16a, which lies within the optic zone, is normally spaced from the corneal surface so as to provide a space or reservoir for lachrymal fluid. In use, this lens of FIG. 2 provides substantially uniform power throughout the optic zone thereof even though the shoulder or surface 26a which separates the portions 16a and 18a is present.

An advantageous feature of the present invention is that circulation of lachrymal fluid in the optical zone is assured. Further, by reason of the particular shaping of the contacting portion of the lens, wearing of the lens is comfortable. As will now be apparent, the contacting portions 16 and 18a of the two lenses of FIGS. 1 and 2, respectively, must be large enough in diameter to assure adherence, during normal wearing, to the cornea. This size may vary, of course, without departing from the scope of this invention, but preferably is as small as possible in order to provide the near normal tear flow as already described.

The outer perimeter is smoothly rounded, as shown, to guard against irritation of the eyelids or corneal surface.

While the various radii R have been described as being equal, the refraction of the two different thicknesses of the lens in the regions of the two surfaces 16, and 18, respectively, may require a slight difference in the two radii R to assure uniform optical power throughout the optical zone; however, this difference in radii is so small that it may be regarded as negligible. Such a deviation in the two radii is regarded as being within the scope of this invention.

The shape of surface 16 is shown as circular as can be manufactured readily with current manufacturing techniques, but can be of any other shape so long as the concept of equal optical power within the optical zone with offset inner surfaces is maintained.

While I have described above the principles of my invention in connection with specific apparatus, it is to be clearly understood that this description is made only by way of example and not as a limitation to the scope of my invention.

What is claimed is:

1. A corneal contact lens of generally concavo-convex form having a maximum diameter slightly smaller than the limbus of the eye, the concave surface of said lens including two stepped curvature portions, one of said portions being offset rearwardly of the other, said one of said portions which is offset rearwardly having a curvature which conforms substantially to the natural curvature of the central corneal cap, said portions being of the same radius with the respective centers of curvature thereof being spaced apart on the optical axis of said lens, said one portion being substantially circular and centrally disposed in said concave surface, the other portion concentrically surrounding said one portion, said portions being joined by an annular axially extending surface substatially normal to the concave surface of said lens and disposed within the optic zone, said other portion providing a tear duct through which tear flow may be accommodated, the convex surface of said lens having a uniform curvature throughout the optic zone and the power of said lens being substantially uniform throughout the optic zone.

2. A corneal contact lens of generally concavo-convex form having a maximum diameter slightly smaller than the limbus of the eye, the concave surface of said lens including two stepped curvature portions, one of said portions being offset rearwardly of the other, said one of said portions which is offset rearwardly having a curvature which conforms substantially to the natural curvature of the cornea, said portions being of the same radius with the respective centers of curvature thereof being spaced apart on the optical axis of said lens, the other forwardly offset portion being substantially circular and centrally disposed in said surface, said one portion concentrically surrounding said other portion, said portions being joined by an annular axially extending surface substantially normal to the concave surface of said lens and disposed within the optic zone, said other portion providing a tear reservoir the convex surface of said lens having a uniform curvature throughout the optic zone, and the power of said lens being substantially uniform throughout the optic zone.

References Cited

UNITED STATES PATENTS

| | | | |
|---|---|---|---|
| 2,809,556 | 10/1957 | Hornstein | 88—54.5 |
| 3,037,425 | 6/1962 | De Carle | 88—54.5 |

FOREIGN PATENTS

| | | |
|---|---|---|
| 802,486 | 10/1958 | Great Britain. |
| 852,836 | 11/1960 | Great Britain. |

DAVID H. RUBIN, *Primary Examiner.*

UNITED STATES PATENT OFFICE
CERTIFICATE OF CORRECTION

Patent No. 3,415,597

December 10, 19

Willard J. Harman

It is certified that error appears in the above identified patent and that said Letters Patent are hereby corrected as shown below:

Column 3, line 7, "14" should read -- 24 --. Column 4, line 3, "official should read -- optical --; line 62, "substatially" should read -- substantial --.

Signed and sealed this 14th day of April 1970.

(SEAL)
Attest:

Edward M. Fletcher, Jr.
Attesting Officer

WILLIAM E. SCHUYLER, JR.
Commissioner of Patents